(12) United States Patent
Yoshida et al.

(10) Patent No.: US 11,539,260 B2
(45) Date of Patent: Dec. 27, 2022

(54) STATOR AND MOTOR

(71) Applicant: NIDEC CORPORATION, Kyoto (JP)

(72) Inventors: Yusaku Yoshida, Dalian (CN);
Shunsuke Murakami, Kyoto (JP); Yu Wang, Dalian (CN); Ting Huang, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 140 days.

(21) Appl. No.: 17/211,890

(22) Filed: Mar. 25, 2021

(65) Prior Publication Data

US 2021/0305874 A1 Sep. 30, 2021

(30) Foreign Application Priority Data

Mar. 27, 2020 (CN) .......................... 202010227586.0

(51) Int. Cl.
*H02K 3/52* (2006.01)
*H02K 3/34* (2006.01)
*H02K 1/16* (2006.01)
*H02K 3/28* (2006.01)

(52) U.S. Cl.
CPC .............. *H02K 3/522* (2013.01); *H02K 1/16* (2013.01); *H02K 3/28* (2013.01); *H02K 3/345* (2013.01)

(58) Field of Classification Search
CPC ............. H02K 3/522; H02K 1/16; H02K 3/28
USPC ........................................................ 310/40 r
See application file for complete search history.

(56) References Cited

U.S. PATENT DOCUMENTS

| 2011/0068647 | A1* | 3/2011 | Sakaue | H02K 3/28 310/71 |
|---|---|---|---|---|
| 2012/0098379 | A1* | 4/2012 | Yamaguchi | H02K 3/522 310/198 |
| 2015/0137637 | A1* | 5/2015 | Jang | H02K 3/522 29/598 |
| 2015/0188376 | A1* | 7/2015 | Yamaguchi | H02K 3/28 310/71 |
| 2016/0336829 | A1* | 11/2016 | Haru | H02K 5/225 |
| 2020/0014272 | A1* | 1/2020 | Asahi | H02K 11/25 |

FOREIGN PATENT DOCUMENTS

JP 2019170123 10/2019

* cited by examiner

*Primary Examiner* — Alexander Talpalatski
(74) *Attorney, Agent, or Firm* — JCIPRNET

(57) ABSTRACT

Embodiments of the present application provide a stator, comprising a coil group is provided with a first end part, a second end part, multiple coils respectively wound on a multiple teeth, and a transition line part configured to connect multiple coils, the first end part is provided with a first overlapping part having the same position as at least a part of the second end part in the circumferential direction, the second end part is provided with a second overlapping part having the same position as the first overlapping part in the circumferential direction, and a coil connecting part is connected with the first overlapping part and the second overlapping part.

15 Claims, 12 Drawing Sheets

STATOR AND MOTOR

CROSS-REFERENCE TO RELATED APPLICATIONS

This application is based on and claims priority under 35 USC 119 from China Patent Application No. 202010227586.0 filed Mar. 27, 2020. The entirety of the above-mentioned patent application is hereby incorporated by reference herein and made a part of this specification.

TECHNICAL FIELD

The present application relates to the electromechanical field.

BACKGROUND ART

In the production of motors, there is a process of winding the teeth of a stator. The operation of winding is very complex, and the following several winding solutions are generally included. The first solution is as follows: multiple wires are used, each wire winds multiple teeth of corresponding phases, then two ends of each wire are respectively hooked to the hook part of a bus bar along an axial direction, and the end part of the wire is welded to the bus bar of the corresponding phase. The second solution is as follows: a wire is used, the wire is wound on the tooth corresponding to each phase, and then two ends of the wire are respectively hooked to two hook parts of the bus bar along an axial direction and the two ends are welded.

It should be noted that, the above introduction on the technical background is merely for the convenience of a clear and complete description of the technical solutions of the present application, and for the convenience of the understanding by those skilled in the art. The technical solutions mentioned above cannot be considered to be publicly known to those skilled in the art simply because they are described in the technical background section of the present application.

SUMMARY

The inventor found that, the above solutions both have the problem of complex winding, and there is a process in which the end parts of the wire need to be respectively connected to a bus bar, therefore, the above solutions have the problems of complex process and long consumed time.

To solve at least one or other similar problems in the above problems, embodiments of the present application provide a stator and a motor.

According to a first aspect of an embodiment of the present application, a stator is provided. The stator includes: an iron core back, wherein the iron core back is configured to be a circular ring with a center axis which extends along an up and down direction as the center; multiple teeth, wherein the teeth protrude from the iron core back towards the radial inner side; an insulating part, wherein the insulating part covers at least axial end faces of the multiple teeth; coil groups, wherein the coil groups are respectively wound on the multiple teeth across the insulating part; multiple bus bars, wherein each of the multiple bus bars is provided with a coil connecting part and an external power supply connecting part, the coil connecting part is connected with the coil group, and the external power supply connecting part is connected with the external power supply; a bus bar retainer, configured to support the multiple bus bars, wherein the coil group is provided with a first end part, a second end part, multiple coils respectively wound on the multiple teeth, and a transition line part configured to connect multiple coils, the first end part is provided with a first overlapping part having the same position as at least a part of the second end part in the circumferential direction, the second end part is provided with a second overlapping part having the same position as the first overlapping part in the circumferential direction, and the coil connecting part is connected with the first overlapping part and the second overlapping part.

In at least one embodiment, the first overlapping part is overlapped with the second overlapping part in the axial direction.

In at least one embodiment, the first overlapping part is overlapped with the second overlapping part in the radial direction.

In at least one embodiment, the transition line part includes: a transition line connecting part, wherein the transition line connecting part is arranged between two coils which are adjacent in the circumferential direction among the multiple coils, and is connected with the coil connecting part; a first transition line part, wherein the first transition line part is connected between multiple first phase of coils which are separately configured in the circumferential direction; a second transition line part, wherein the second transition line part is connected between multiple second phase of coils which are separately configured in the circumferential direction; a third transition line part, wherein the third transition line part is connected between multiple third phase of coils which are separately configured in the circumferential direction; and the first transition line part, the second transition line part and the third transition line part are configured in sequence towards the direction far away from the multiple teeth axially according to a winding sequence, and the coil connecting part is axially configured to be on a side far away from the multiple teeth relative to the first transition line part, the second transition line part and the third transition line part.

In at least one embodiment, the first overlapping part and the second overlapping part are arranged at an axial upper side of the transition line part.

In at least one embodiment, each of the multiple bus bars is further provided with an intermediate part, and the intermediate part is connected with the coil connecting part and the external power supply connecting part, and the intermediate part is maintained on the bus bar retainer.

In at least one embodiment, the intermediate part is closer to the radial inner side than the coil connecting part.

In at least one embodiment, the insulating part is an insulating piece, the insulating piece is provided with an outer end part and an inner end part, the outer end part is arranged closer to the radial outer side than the multiple coils, the inner end part is arranged closer to the radial inner side than the multiple coils, the outer end part is provided with a first wall part and a second wall part, the first wall part protrudes upwards from the upper surface of the outer end part on the circumferential side of the coil connecting part, the second wall part protrudes upwards from the upper surface of the outer end part on another circumferential side of the coil connecting part, the first wall part is at least partially overlapped in the radial direction with the tooth arranged on a circumferential side in the two teeth which are adjacent in the circumferential direction, the second wall part is at least partially overlapped in the radial direction with the tooth arranged on another circumferential side in the two teeth, the transition line connecting part extends from the second wall part towards the first wall part, and the coil connecting part is arranged between the first wall part and the second wall part in a circumferential direction.

In at least one embodiment, the insulating part is an insulating piece, the insulating piece is provided with an outer end part and an inner end part, the outer end part is arranged closer to the radial outer side than the multiple coils, the inner end part is arranged closer to the radial inner side than the multiple coils, the outer end part is provided with a third wall part and a fourth wall part, the third wall part protrudes upwards from the upper surface of the outer end part on the circumferential side of the coil connecting part, the fourth wall part protrudes upwards from the upper surface of the outer end part on another circumferential side of the coil connecting part, the third wall part is at least partially overlapped in the radial direction with the tooth arranged on a circumferential side in the two teeth which are adjacent in the circumferential direction, the fourth wall part is at least partially overlapped in the radial direction with the tooth arranged on another circumferential side in the two teeth, the third wall part is provided with a first gap part which is concave from the upper surface of the third wall part towards the lower side and which is cut-through in the radial direction, and a first pin part which is arranged on a circumferential side of the first gap part, the fourth wall part is provided with a second gap part which is concave from the upper surface of the fourth wall part towards the lower side and which is cut-through in the radial direction, and a second pin part which is arranged on another circumferential side of the second gap part, the first end part is wound on the second pin part, extends along a circumferential direction from the second gap part towards the first gap part, and is accommodated in the first gap part, and the second end part is accommodated in the second gap part, extends along a circumferential direction from the second gap part towards the first gap part, and is wound on the first pin part.

In at least one embodiment, at least a part of the upper surface of the inner end part is in contact with the lower surface of the bus bar retainer, the outer end part is provided with a notch part, and the notch part is concave downwards from the upper surface of the external end part, and is cut-through in the radial direction, the bus bar retainer is provided with a main body part and a radial protruding part which protrudes from the main body part towards the radial outer side, and the radial protruding part is embedded into the notch part.

In at least one embodiment, the main body part is provided with a reduced diameter part, and the outer circumferential surface of the reduced diameter part is closer to the radial inner side than the outer circumferential surface of other parts of the main body part, and the reduced diameter part is overlapped with at least a part of the coil connecting part in the radial direction.

In at least one embodiment, at least a part of the upper surface of the inner end part is in contact with the lower surface of the bus bar retainer, the bus bar retainer is provided with a main body part and an axial protruding part which protrudes from the main body part towards the axial lower side, and the axial protruding part is embedded between two inner end parts which are adjacent in a circumferential direction.

In at least one embodiment, the main body part is provided with a reduced diameter part, and the outer circumferential surface of the reduced diameter part is closer to the radial inner side than the outer circumferential surface of other parts of the main body part, and the reduced diameter part is overlapped with at least a part of the coil connecting part in the radial direction.

According to a second aspect of the embodiment of the present application, a motor is provided. The motor includes: the stator mentioned in any of the above embodiments; a rotor configured at a radial inner side of the stator; and a motor housing accommodating the stator and the rotor.

In at least one embodiment, the inner circumferential surface of the motor housing is provided with a first inner circumferential surface, wherein the first inner circumferential surface is in contact with the outer circumferential surface of the stator; a second inner circumferential surface, wherein the second inner circumferential surface is closer to the radial outer side than the first inner circumferential surface; and a segment difference surface, wherein the segment difference surface is connected with the first inner circumferential surface and the second inner circumferential surface, the segment difference surface is configured with a riveted part, and the stator is fixed at the first inner circumferential surface through the riveted part.

Embodiments of the present application have the following beneficial effects: when the first overlapping part of the first end part and the second overlapping part of the second end part are arranged to be at the same position in the circumferential direction, the first end part and the second end part can be connected with the coil connecting part of the bus bar through one assembly operation of the bus bar, thereby lowering complexity of the process, reducing manhours, and reducing the production cost, moreover, since the first end part and the second end part have an overlapped part in the axial or radial direction, the size of the stator is further reduced.

With reference to the description and drawings below, specific embodiments of the present application are disclosed in detail, and the ways in which the principles of the present application can be adopted are indicated. It should be understood that, the embodiments of the present application are not therefore limited in scope. The embodiments of the present application include many changes, modifications and equivalents within the scope of terms of the attached claims.

The characteristics described and/or shown in one embodiment may be used in one or more other embodiments in the same or similar manner, to combine with the characteristics in other embodiments, or substitute the characteristics in other embodiments.

It should be emphasized that, the term "include/including" as used in this text refers to the presence of a characteristic, entire piece, step or component, but does not exclude the presence or addition of one or more other characteristics, entire pieces, steps or components.

BRIEF DESCRIPTION OF DRAWINGS

The elements and characteristics described in one of the drawings or in one of the embodiments of the present application may be combined with the elements and characteristics shown in one or more other drawings or embodiments. In addition, in the drawings, a similar reference numeral represents the corresponding part in several drawings, and may be used to indicate the corresponding part used in more than one embodiment.

The included drawings are used for providing a further understanding of embodiments of the present application, constitute a part of the description, are used for illustrating embodiments of the present application, and illustrate the principles of the present application together with the text description. Apparently, the drawings described below are merely some embodiments of the present application, and for those skilled in the art, other drawings can also be obtained according to these drawings without any creative effort. In the drawings.

DESCRIPTION OF EMBODIMENTS

Figure 1:
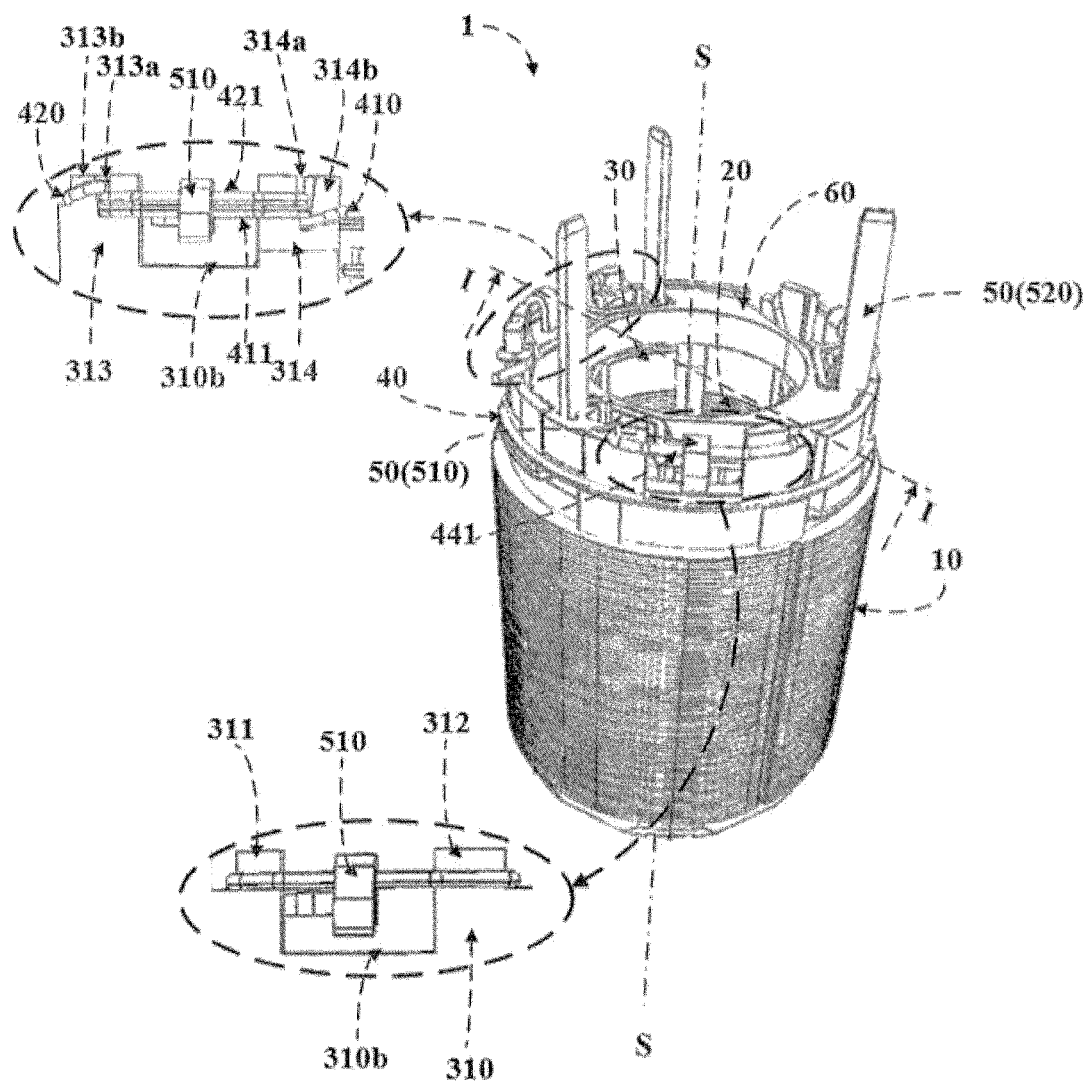
FIG. 1 is a schematic diagram of a stator in an embodiment of the present application.

With reference to the drawings, the above and other characteristics of the present application will become apparent through the following description. In the description and the drawings, specific embodiments of the present application are specifically disclosed, indicating part of the embodiments which can adopt the principles of the present application. It should be understood that, the present application is not limited to the described embodiments, on the contrary, the present application includes all the modifications, variations and equivalents falling within the scope of the appended claims. Various embodiments of the present application are illustrated in combination with the drawings. These embodiments are merely exemplary, rather than a limitation to the present application.

In the embodiments of the present application, the terms "first", "second", "above", "below" and the like are used to distinguish different elements in terms of appellation, but do not imply the spatial arrangement or chronological order of these elements, and these elements should not be limited by these terms. The term "and/or" includes any one and all combinations of one or more of the listed associated terms. The terms "include", "including", "have" mean the existence of a stated characteristic, element, component, or subassembly, but do not exclude the existence or addition of one or more other characteristics, elements, components, or subassemblies.

In the embodiments of the present application, the singular forms such as "one" and "the" including the plural form should be broadly understood as "one" or "one type", and should not be limited to the meaning of "one"; in addition, the term "the" shall be construed to include both the singular form and the plural form unless otherwise expressly stated in the text. In addition, the term "according to" should be understood to mean "at least partially according to . . . ", and the term "based on" should be understood to mean "at least partially based on . . . ", unless otherwise expressly stated in the text.

In addition, in the following description of the embodiments of the present application, for the convenience of description, the radius direction taking the center axis of the rotating axis of the motor or the center axis of the stator as the center is called "radial direction", the direction around the above center axis is called "the circumferential direction", the side far away from the center axis along the radius direction is called "the radial outer side", the side close to the center axis along the radius direction is called "the radial inner side", the direction along the above center axis or the direction in parallel with the center axis is called "the axial direction S", the side of the "axial direction S" is called "an upper side", the side opposite to the "upper side" is called "a lower side", the direction along the "axial direction" is called "an up and down direction", the direction from one side towards the other side along the "axial direction" is called the direction "from top to bottom", and the direction opposite to the direction "from top to bottom" is called the direction "from bottom to top". In addition, the surface close to the "upper side" is called "an upper surface", and the surface close to the "lower side" is called "a lower surface".

Embodiment of the First Aspect

Figure 2:
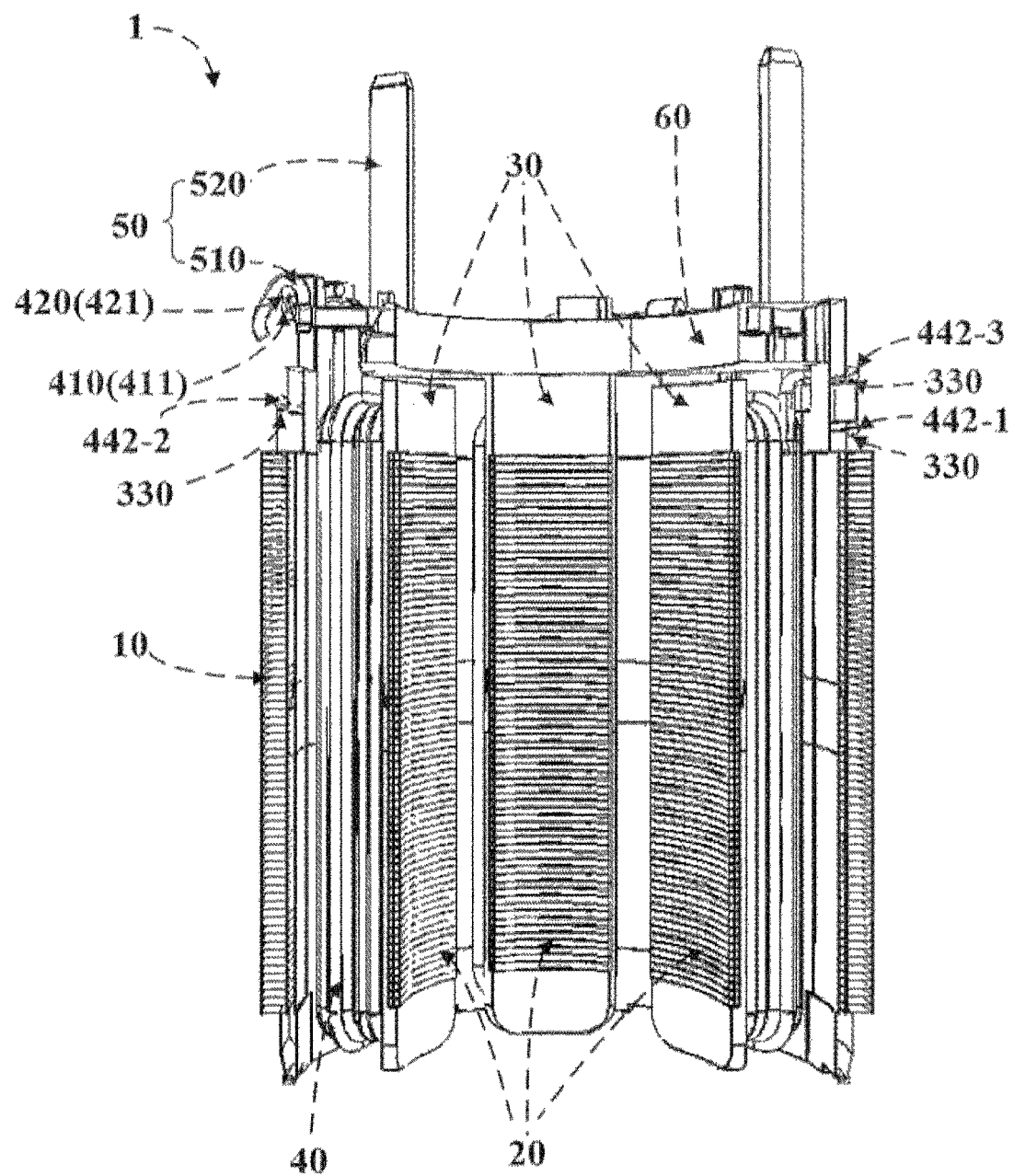
FIG. 2 is a sectional view of the stator shown in FIG. 1 along an I-I direction.

An embodiment of the first aspect of the present application provides a stator, FIG. 1 is a schematic diagram of a stator, and FIG. 2 is a sectional view of the stator of FIG. 1 along an I-I direction.

In an embodiment of the present application, as shown in FIG. 1, the stator 1 includes an iron core back 10, multiple teeth 20, an insulating part 30, coil groups 40, multiple bus bars 50 and a bus bar retainer 60.

As shown in FIG. 2, the iron core back 10 is configured to be a circular ring with the center axis extending along the up and down direction as the center, the teeth 20 protrude from the iron core back 10 towards the radial inner side, the insulating part 30 covers at least the axial end faces of the multiple teeth 20; and the coil groups 40 are respectively wound on multiple teeth 20 across the insulating part 30.

As shown in FIG. 2, the bus bar 50 includes a coil connecting part 510 and an external power supply connecting part 520, the coil connecting part 510 is connected with the coil group 40, and the external power supply connecting part 520 is connected with the external power supply (not shown in FIG. 2).

As shown in FIG. 2, the bus bar retainer 60 supports multiple bus bars 50.

Figure 3:
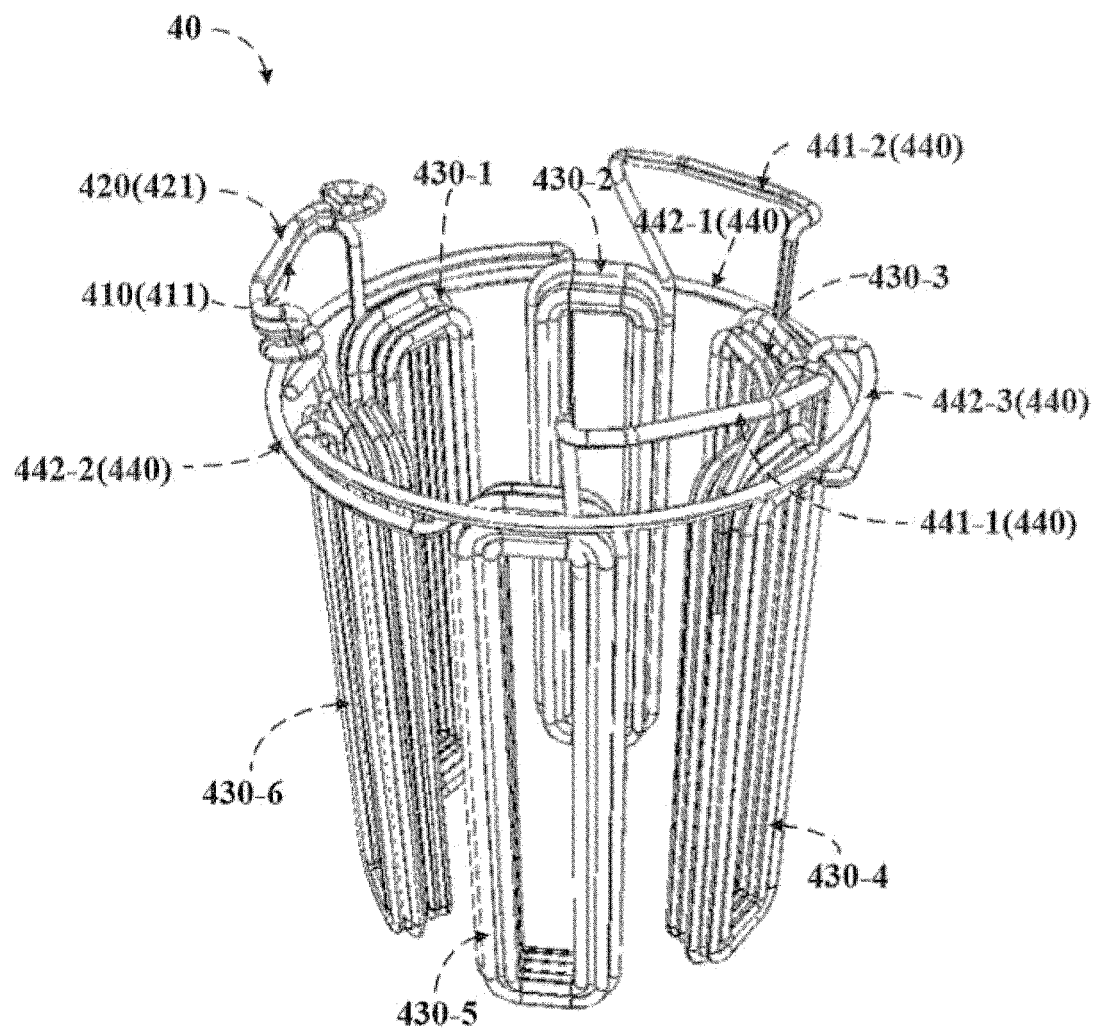
FIG. 3 is a schematic diagram of a coil group of an embodiment of the present application.

FIG. 3 is a schematic diagram of a coil group.

As shown in FIG. 3, the coil group 40 includes a first end part 410, a second end part 420, multiple coils 430-1 to 430-6 (also simply referred to as "multiple coils 430" below) and a transition line part 440, wherein multiple coils 430 are respectively wound on the multiple teeth 20 (not shown in FIG. 3), and the transition line part 440 is connected with multiple coils 430.

As shown in FIG. 1 and FIG. 3, the first end part 410 is provided with a first overlapping part 411 which has the same position as at least a part of the second end part 420 in a circumferential direction, the second end part 420 is provided with a second overlapping part 421 which has the same position as the first overlapping part 411 in a circumferential direction, for example, the first overlapping part 411 and the second overlapping part 421 are arranged within the same circle center angle range in a circumferential direction.

As shown in FIG. 2, when the coil connecting part 510 is assembled towards the direction of the first overlapping part and the second overlapping part, the coil connecting part 510 is connected with the first overlapping part 411 and the second overlapping part 421. Therefore, when the first overlapping part 411 of the first end part 410 and the second overlapping part 421 of the second end part 420 are arranged to be at the same position in the circumferential direction, the first end part and the second end part can be connected with the coil connecting part of the bus bar through one assembly operation of the bus bar, thereby lowering complexity of the process, reducing man-hours, and reducing the production cost. And moreover, since the first end part and the second end part have an overlapped part in the axial direction or radial direction, the size of the stator is further reduced.

In at least one embodiment, as shown in FIG. 3, the first overlapping part 411 may be axially overlapped with the second overlapping part 421, thereby being capable of reducing the radial size of the stator, inhibiting enlargement of the stator towards the radial outer side, and further inhibiting enlargement of the aftermentioned motor towards the radial outer side. However, the embodiment of the present application is not limited to this, the first overlapping part 411 may further be overlapped with the second overlapping part 421 in the radial direction, thereby reducing the axial size of the stator, inhibiting overlength of the stator in the axial direction, and further inhibiting overlength of the aftermentioned motor in the axial direction.

In at least one embodiment, as shown in FIG. 3, the transition line part 440 includes: transition line connecting parts 441-1 and 441-2 (also simply referred to as "transition line part 441" below), a first transition line part 442-1, a second transition line part 442-2 and a third transition line part 442-3.

As shown in FIG. 3, the transition line connecting part 441 is arranged between two adjacent coils which are adjacent to each other in a circumferential direction among multiple coils 430, for example, the transition line connecting part 441-1 is arranged between adjacent coils 430-4 and 430-5, and the transition line connecting part 441-2 is arranged between adjacent coils 430-2 and 430-3, moreover, as shown in FIG. 1, the transition line connecting part 441 is connected with the coil connecting part 510.

As shown in FIG. 3, the first transition line part 442-1 is connected with multiple first phase of coils which are configured separately in a circumferential direction, for example, the first transition line part 442-1 is connected with the coil 430-1 and coil 430-4; the second transition line part 442-2 is connected with multiple second phase of coils which are configured separately in a circumferential direction, for example, the second transition line part 442-2 is connected with coil 430-5 and coil 430-2; and the third transition line part 442-3 is connected with multiple third phase of coils which are configured separately in a circumferential direction, for example, the third transition line part 442-3 is connected with coil 430-3 and coil 430-6. In addition, the coil 430-1 and the coil 430-4 for example correspond to a U phase, the coil 430-5 and the coil 430-2 for example correspond to a V phase, and the coil 430-3 and the coil 430-6 for example correspond to a W phase, however, the phase corresponding to each coil is not limited in the embodiment of the present application, for example, the coil 430-1 and the coil 430-4 may also correspond to a V phase, the coil 430-5 and the coil 430-2 may also correspond to a W phase, and the coil 430-3 and the coil 430-6 may also correspond to a U phase, and correspondence may be performed according to actual requirements or with reference to related technology, which is not enumerated herein.

In addition, six coils 430-1 to 430-6 are taken as an example above for description, however, the number of the coils 430 is not limited in the embodiment of the present application, and other numbers of coils may also be included.

As shown in FIG. 3, the first transition line part 442-1, the second transition line part 442-2 and the third transition line part 442-3 are arranged according to a sequence from bottom to top, for example, the first transition line part 442-1, the second transition line part 442-2 and the third transition line part 442-3 are configured in sequence towards a direction far away from multiple teeth 20 (not shown in FIG. 3) in an axial direction according to a winding sequence, and the coil connecting part 510 is configured to be on a side far away from multiple teeth 20 (not shown in FIG. 3) in an axial direction relative to the first transition line part 442-1, the second transition line part 442-2 and the third transition part 442-3, thereby facilitating entrance of the nozzle into a line inlet groove of the insulating part during winding. In addition, at least a part of the first transition line part 442-1, the second transition line part 442-2 and the third transition part 442-3 are overlapped in the axial direction, thereby reducing the radial size of the stator, inhibiting enlargement of the stator towards the radial outer side, and further inhibiting enlargement of the aftermentioned motor towards the radial outer side. Moreover, coils can be wound continuously, thereby simplifying the winding operations, and shortening the production time.

In at least one embodiment, the first overlapping part 411 and the second overlapping part 421 are arranged at an axial upper side of the transition line part 440, for example, as shown in FIG. 3, the first overlapping part 411 and the second overlapping part 421 are arranged at the axial upper side of the second transition line part 442-2, thereby reducing the radial size of the stator, and inhibiting enlargement of the stator towards the radial outer side.

Figure 4:
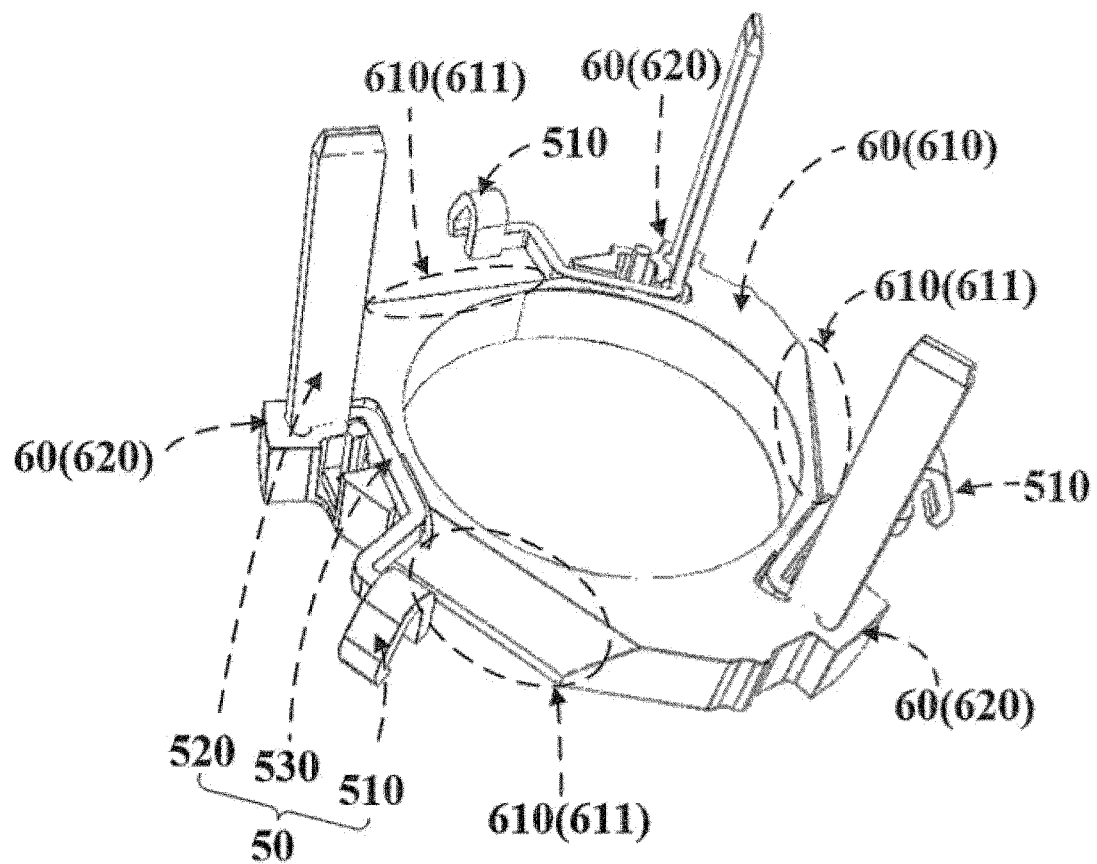
FIG. 4 is a schematic diagram of a bus bar and a bus bar retainer provided in an embodiment of the present application.

FIG. 4 is a schematic diagram of a bus bar and a bus bar retainer of an embodiment of the present application.

In at least one embodiment, as shown in FIG. 4, multiple bus bars 50 are further provided with an intermediate part 530, the intermediate part 530 is connected with a coil connecting part 510 and an external power supply connecting part 520, and the intermediate part 530 is maintained in the bus bar retainer 60, thereby easily fixing the bus bar on the bus bar retainer.

In addition, at least a part of the bus bar 50 may be insert molded in the bus bar retainer 60, for example, the intermediate part 530 may be insert molded in the bus bar retainer 60; the bus bar 50 may also be fixed in the bus bar retainer 60 through a heat welding manner, for example, the intermediate part 530 may be heat welded and fixed to the bus bar retainer 60; a groove may also be arranged on the bus bar retainer 60, to press and fix the bus bar 50 to the bus bar retainer 60, for example, the intermediate part 530 is pressed and fixed to the groove arranged on the bus bar retainer 60. The bus bar 50 and the bus bar retainer 60 may further be fixed through other manners, and specific fixation manners are not limited in the embodiments of the present application.

In addition, as shown in FIG. 4, the intermediate part 530 of the bus bar 50 may be maintained in the main body part 610 of the aftermentioned bus bar retainer 60.

In at least one embodiment, as shown in FIG. 4, the intermediate part 530 of the bus bar 50 is closer to the radial inner side of the coil connecting part 510, thereby being capable of inhibiting enlargement of the stator towards the radial outer side, and further inhibiting enlargement of the aftermentioned motor towards the radial outer side.

Figure 5:
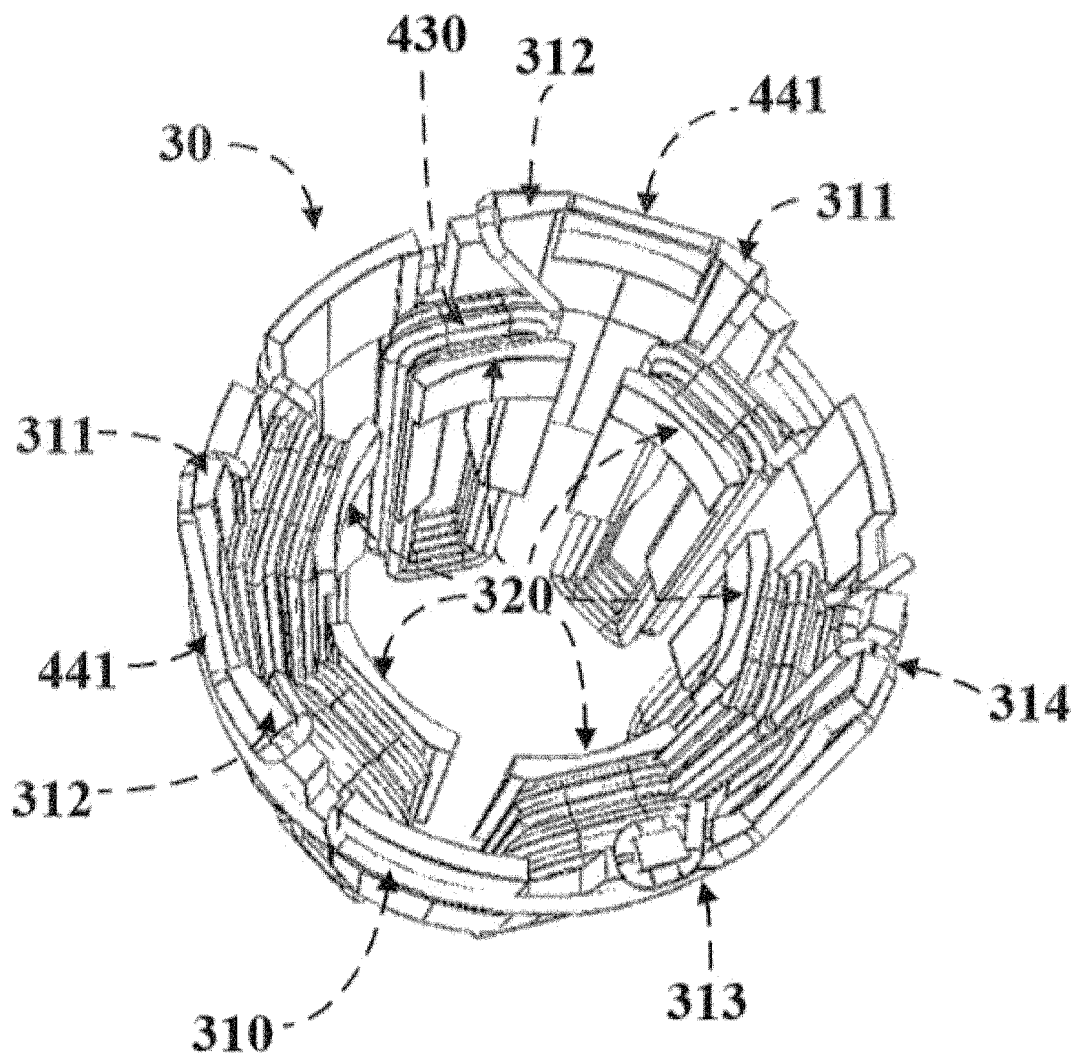
FIG. 5 is a schematic diagram of an insulating part of an embodiment of the present application after winding when viewed from one direction.
Figure 6:
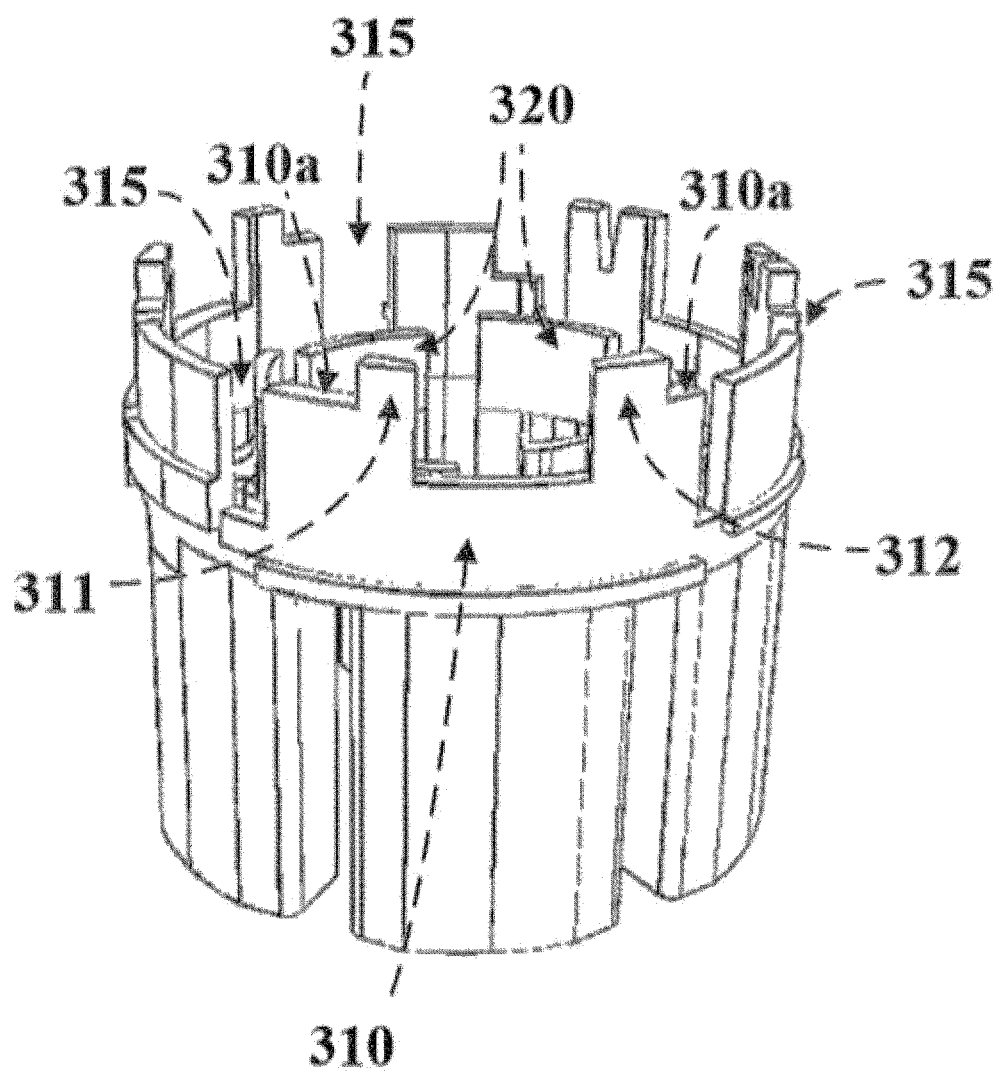
FIG. 6 is a schematic diagram of an insulating part of an embodiment of the present application when viewed from another direction.
Figure 7:
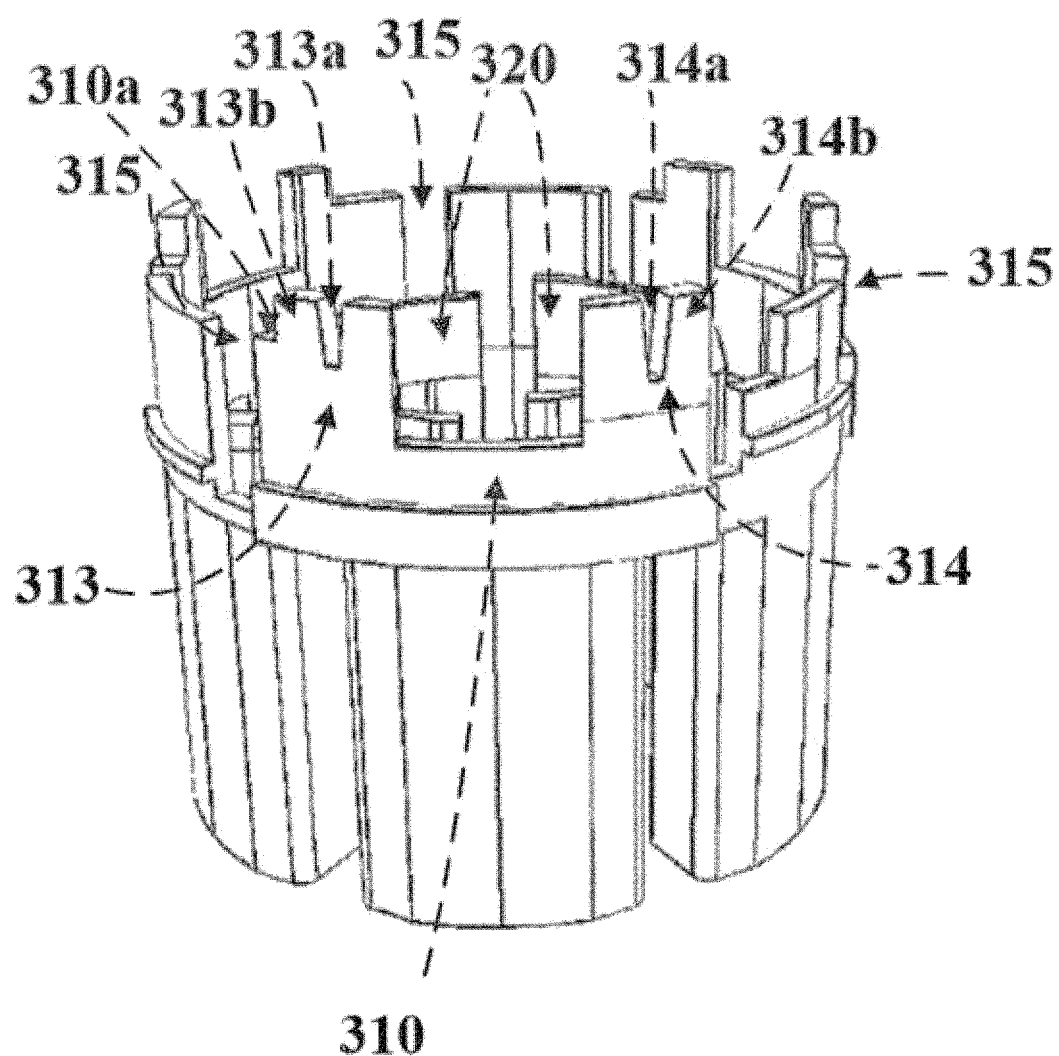
FIG. 7 is a schematic diagram of an insulating part of an embodiment of the present application when viewed from another direction different from the direction shown in FIG. 6.

FIG. 5 is a schematic diagram of an insulating part of an embodiment of the present application after winding when viewed from one direction, FIG. 6 is a schematic diagram of an insulating part of an embodiment of the present application when viewed from another direction, and FIG. 7 is a schematic diagram of an insulating part of an embodiment of the present application when viewed from another direction different from the direction shown in FIG. 6.

In at least one embodiment, the insulating part 30 may be an insulating piece (simply referred to as "insulating piece 30" below), as shown in FIG. 5, the insulating piece 30 is provided with an outer end part 310 and an inner end part 320, the outer end part 310 is closer to the radial outer side than multiple coils 430, and the inner end part 320 is closer to the radial inner side than the multiple coils 430.

As shown in FIG. 6, the outer end part 310 may be provided with a first wall part 311 and a second wall part 312, and the first wall part 311 and the second wall part 312 protrude upwards from the upper surface 310*a* of the outer end part 310. As shown in the partial enlarged view at the bottom part in FIG. 1, the first wall part 311 is arranged on a circumferential side of the coil connecting part 510, and the second wall part 312 is arranged on another circumferential side of the coil connecting part 510, and the coil connecting part 510 is arranged circumferentially between the first wall part 311 and the second wall part 312.

As shown in FIG. 5, the first wall part 311 is at least partially overlapped in the radial direction with the tooth arranged on a circumferential side of the two teeth which are adjacent in the circumferential direction (the position of the tooth 20 corresponds to the position of the inner end part 320, and tooth 20 is not shown in FIG. 5), the second wall part 312 is at least partially overlapped in the radial direction with the tooth arranged on another circumferential side of the two teeth, and the transition line connecting part 441 extends from the second wall part 312 towards the first wall part 311.

In at least one embodiment, as shown in FIG. 7, the outer end part 310 may further be provided with a third wall part 313 and a fourth wall part 314, and the third wall part 313 and the fourth wall part 314 protrude upwards from the upper surface 310*a* of the outer end part 310. As shown in the partial enlarged view at the top part in FIG. 1, the third wall part 313 is arranged on a circumferential side of the coil connecting part 510, and the fourth wall part 314 is arranged on another circumferential side of the coil connecting part 510.

As shown in FIG. 5, the third wall part 313 is at least partially overlapped in the radial direction with the tooth arranged on a circumferential side of the two teeth which are adjacent in the circumferential direction (the position of the tooth 20 corresponds to the position of the inner end part 320, and tooth 20 is not shown in FIG. 5), and the fourth wall part 314 is at least partially overlapped in the radial direction with the tooth arranged on another circumferential side of the two teeth.

As shown in FIG. 7, the third wall part 313 is provided with a first gap part 313*a* and a first pin part 313*b*, the first gap part 313*a* is concave from the upper surface of the third wall part 313 towards the lower side, and is cut-through the third wall part 313 in a radial direction, and the first pin part 313*b* is arranged on a circumferential side of the first gap part 313*a*; the fourth wall part 314 is provided with a second gap part 314*a* and a second pin part 314*b*, the second gap part 314*a* is concave from the upper surface of the fourth wall part 314 towards the lower side, and is cut-through the fourth wall part 314 in a radial direction, and the second pin part 314*b* is arranged on another circumferential side of the second gap part 314*a*.

As shown in the partial enlarged view at the top part in FIG. 1, the first end part 410 is wound on the second pin part 314*b*, extends along a circumferential direction from the second gap part 314*a* towards the first gap part 313*a*, and is accommodated in the first gap part 313*a*. The second end part 420 is accommodated in the second gap part 314*a*, extends along a circumferential direction from the second gap part 314*a* towards the first gap part 313*a*, and is wound on the first pin part 313*b*.

For example, the coils 430-1 to 430-6 are respectively recorded as the first coil to the sixth coil, the teeth corresponding to the coils 430-1 to 430-6 are respectively recorded as the first tooth to the sixth tooth, and one wire may be used for wire winding through the following manner:

the wire is wound on the second pin part 314*b*, and is led out towards the radial outer side from the radial inner side via the second gap part 314*a* (that is, the first end part 410 of the wire is wound on the second pin part 314*b*), the wire is wound from the second gap part 314*a* towards the first gap part 313*a*, and is led from the radial outer side towards the radial inner side and led into the first gap part 313*a*, afterwards, the wire extends from the first gap part towards the position between the first tooth and the sixth tooth (that is, the first end part is accommodated in the first gap);

the wire is wound on the first tooth, to constitute a first coil 430-1, afterwards, the wire is led towards the third tooth and the fourth tooth, and then is wound on the fourth tooth, to form a fourth coil 430-1, and the first coil 430-1 and the fourth coil 430-4 are connected through a first transition line part 442-1. In addition, the first coil 430-1 and the fourth coil 430-4 may correspond to the first phase, for example phase U;

after the wire is wound on the fourth tooth, the wire is then wound on the fifth tooth, to form a fifth coil 430-5, and the fourth coil 430-4 and the fifth coil 430-5 are connected through a transition line connecting part 441-1;

the wire is wound on the fifth tooth, then is guided between the first tooth and the second tooth, and then is wound on the second tooth to form a second coil 430-2, and the fifth coil 430-5 and the second coil 430-2 are connected through a second transition line part 442-2. In addition, the second coil 430-2 and the fifth coil 430-5 may correspond to the second phase, for example phase V;

after the wire is wound on the second tooth, the wire is then wound on the third tooth, to form a third coil 430-3, and the third coil 430-3 and the second coil 430-2 are connected through a transition line connecting part 441-2;

after the wire is wound on the third tooth, then the wire is guided between the fifth tooth and the sixth tooth, and then is wound on the sixth tooth to form a six coil 430-6, and the third coil 430-3 and the sixth coil 430-6 are connected through a third transition line part 442-3. In addition, the third coil 430-3 and the sixth coil 430-6 may correspond to the third phase, for example phase W;

after the wire is wound on the sixth tooth, the wire is led out towards the second gap part 314a, the wire is led out towards the outer side from the radial inner side via the second gap part 314a, afterwards, the wire is wound from the second gap part 314a towards the first gap part 313a (that is, the second end part 420 is accommodated in the second gap part 314a), afterwards, the wire is wound on the first pin part 313b (that is, the second end part 420 is wound on the first pin part 313b).

Winding is finished through the above operations.

In addition, the six coils 430 obtained through the above winding manner may be connected through delta connection. Furthermore, when the stator 1 is applied to the aftermentioned motor, the motor is further arranged with a rotor which is attached with eight magnets in the circumferential direction, that is, the motor is an eight-pole and six-slot type motor. However, the number of coils contained in the stator in the embodiment of the present application is not limited, and the number of magnetic poles of the rotor is also not limited, the stator of the embodiment of the present application may also be applied to other types of motors, and the specific types of the motors are not limited in the embodiment of the present application.

In addition, according to the above winding manner, the tail end of the second end part 420 is towards the radial inner side, therefore, the tail end of the second end part 420 and the aftermentioned motor housing are configured separately, such that a certain insulating distance exists between the wire and the motor housing, and when the motor housing is made of metal, the reliability of the motor is improved.

In addition, the embodiment of the present application is not limited to the above winding manners, other winding manners may also be adopted according to actual requirements, and specific winding manners are not limited in the embodiment of the present application.

Figure 8:
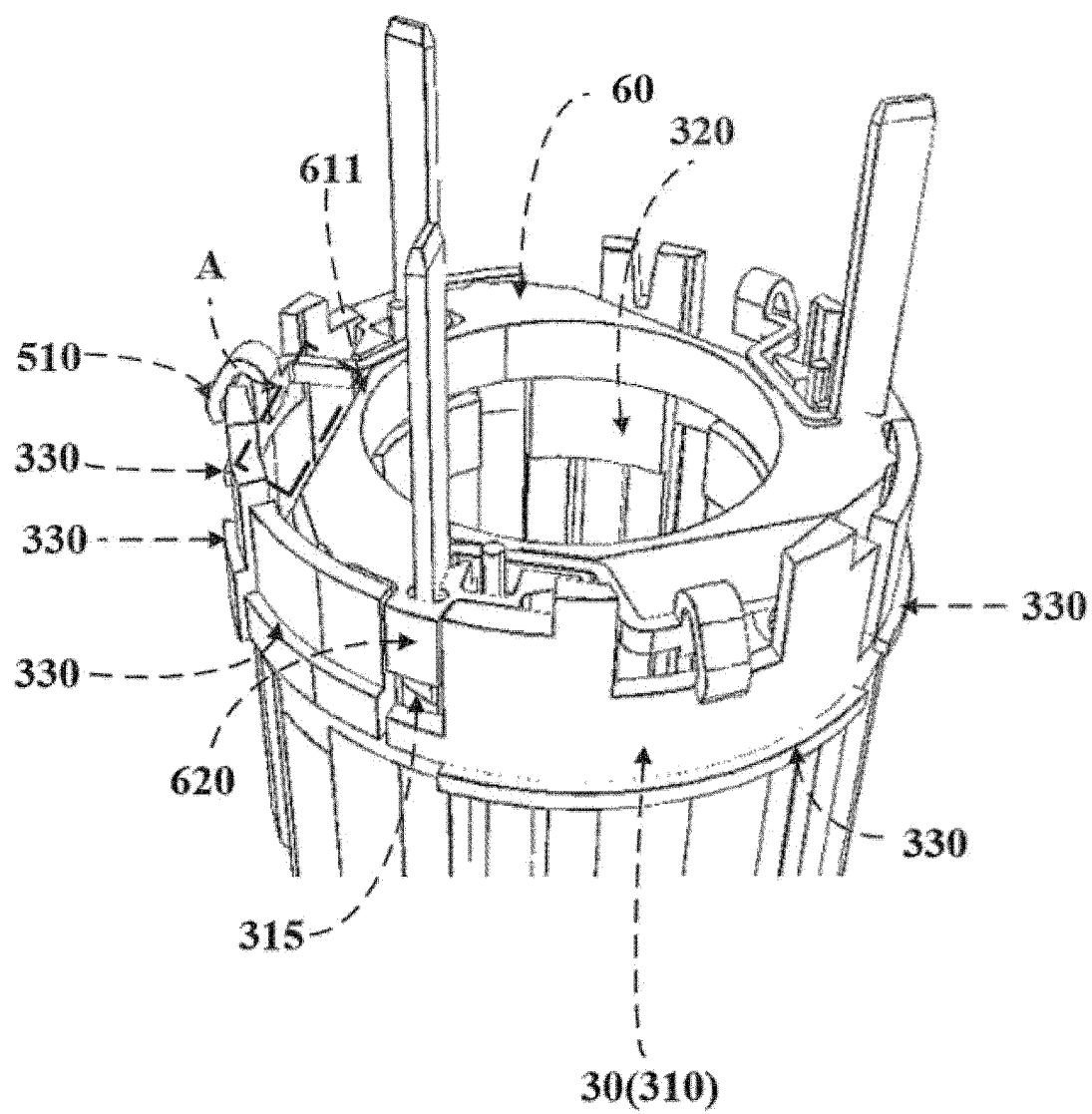
FIG. 8 is a schematic diagram showing that a bus bar and a bus bar retainer of an embodiment of the present application are mounted on the insulating part.

FIG. 8 is a schematic diagram showing that a bus bar and a bus bar retainer are mounted on the insulating part.

In at least one embodiment, as shown in FIG. 8, at least a part of the upper surface of the inner end part 320 of the insulating piece 30 is in contact with the lower surface of the bus bar retainer 60. As shown in FIG. 6 and FIG. 7, the outer end part 310 is provided with a notch part 315, the notch part 315 is concave towards the bottom from the upper surface 310a of the outer end part, and is cut-through in the radial direction. The number of the notch part 315 is one or more, and the size may be the same and may also be different. When the size is different, an effect of mistake proofing can be played during mounting.

As shown in FIG. 4, the bus bar retainer 60 is provided with a main body part 610 and a radial protruding part 620, and the radial protruding part 620 protrudes from the main body part 610 towards the radial outer side. As shown in FIG. 8, the radial protruding part 620 is embedded into the notch part 315. Therefore, axial and circumferential positioning of the bus bar retainer 60 can be performed through the notch part 315 and the radial protruding part 620.

For example, the bus bar retainer 60 may be embedded into the insulating piece 30 from the axial upper side of the stator 1, when the radial protruding part 620 is embedded into the notch part 315, the bus bar retainer 60 can be positioned circumferentially. In addition, the number of the radial protruding part 620 is one or more.

In addition, the lower surface of the bus bar retainer 60 may be in contact with at least a part of the upper surface of the inner end part 320, thereby axially positioning the bus bar retainer.

In addition, since at least a part of the upper surface of the inner end part 320 is in contact with the lower surface of the bus bar retainer 60, compared with the contact between the whole upper surface of the inner end part 320 and the lower surface of the bus bar retainer 60, the requirement on precision of the insulating piece 30 can be reduced.

In at least one embodiment, as shown in FIG. 4, the main body part 610 of the bus bar retainer 60 can be provided with a reduced diameter part 611, the outer circumferential surface of the reduced diameter part 611 is closer to the outer circumferential surface of the other parts of the main body part 610, and the reduced diameter part 611 is overlapped with at least a part of the coil connecting part 510 in the radial direction.

As shown in FIG. 8, when the bus bar retainer 60 is embedded into the insulating piece 30, a certain space (marked by a dashed box A in the figure) exists between the reduced diameter part 611 and the inner wall of the outer end part 310 of the insulating piece 30. When a welding tool is used to weld the wire to the coil connecting part 510, the welding tool can be inserted into the space A. Moreover, the welding tool is separated from the bus bar retainer 60 by a certain distance, thereby inhibiting the heat generated by welding from melting, deforming or damaging the bus bar retainer.

Figure 9:
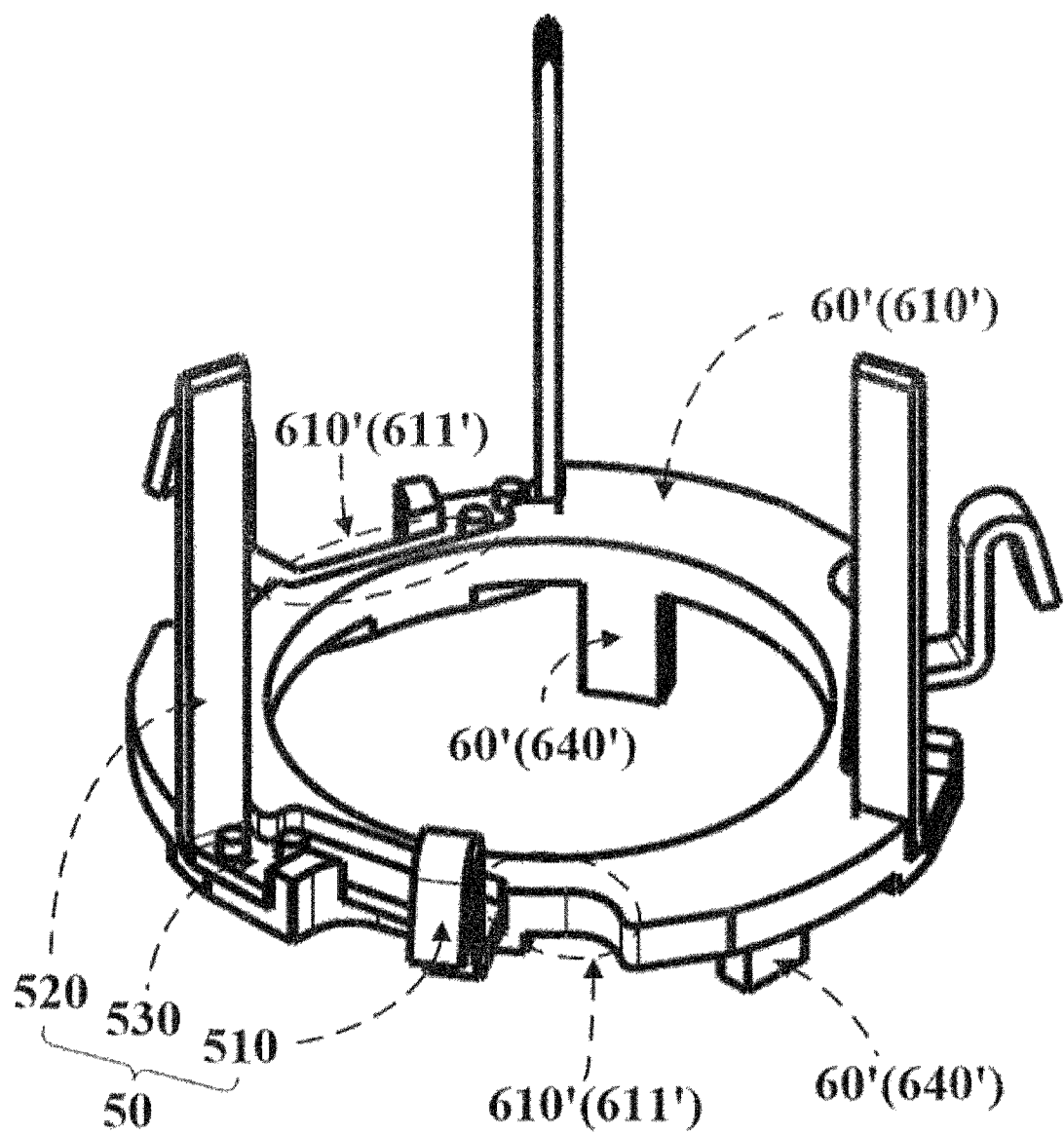
FIG. 9 is a schematic diagram of another embodiment of a bus bar and a bus bar retainer in the present application.
Figure 10:
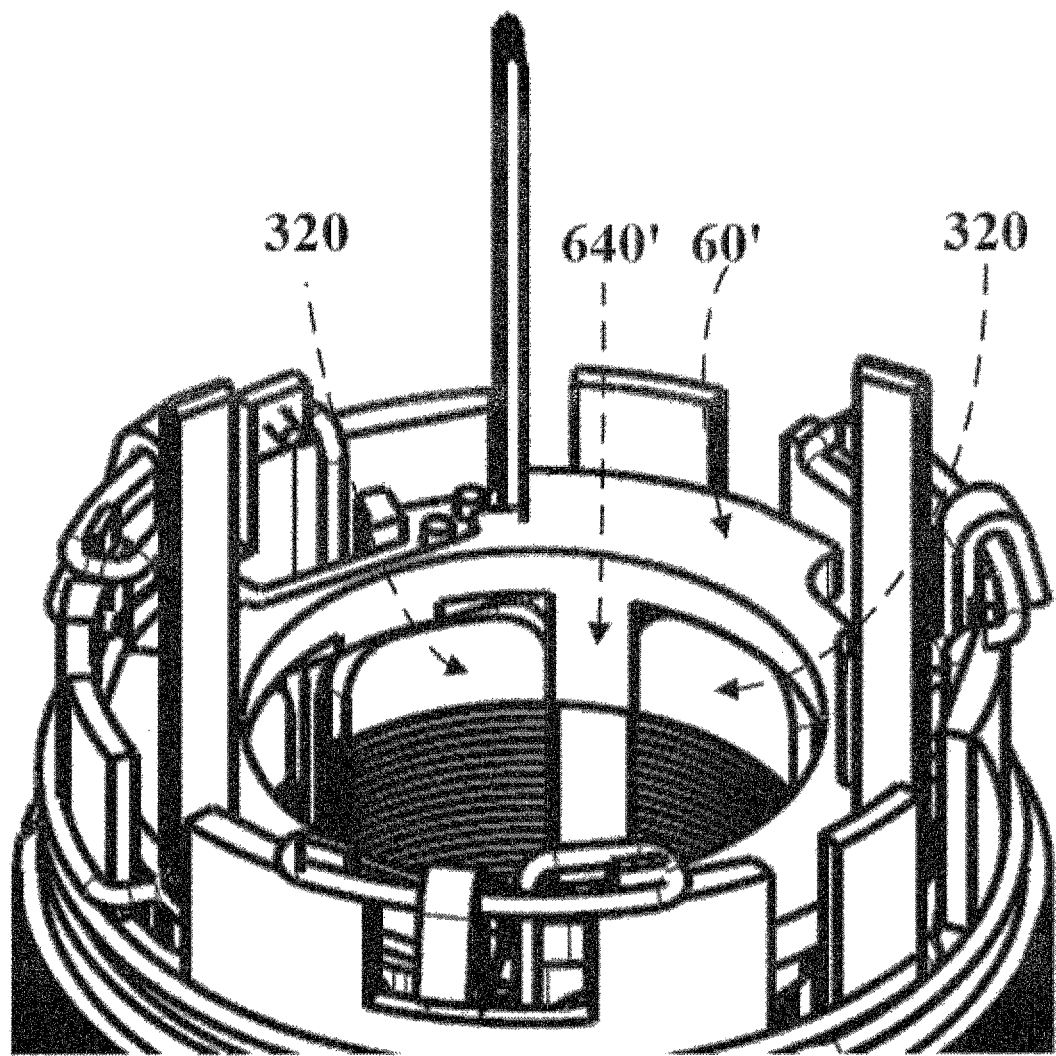
FIG. 10 is a schematic diagram showing that the bus bar and the bus bar retainer shown in FIG. 9 are mounted on the insulating part.

FIG. 9 is a schematic diagram of another embodiment of the bus bar and the bus bar retainer, and FIG. 10 is a schematic diagram showing that the bus bar and the bus bar retainer shown in FIG. 9 are mounted on an insulating part.

In at least one embodiment, as shown in FIG. 9, the bus bar retainer 60' is provided with a main body part 610' and an axial protruding part 640', and the axial protruding part 640' protrudes from the main body part 610' towards the axial lower side.

As shown in FIG. 10, at least a part of the upper surface of the inner end part 320 is in contact with the lower surface of the bus bar retainer 60', and the axial protruding part 640' is embedded between two inner end parts 320 which are adjacent to each other on the circumferential direction. Therefore, the bus bar retainer 60' can be axially and circumferentially positioned through the inner end part 320 and the axial protruding part 640'.

For example, the axial protruding part 640' is embedded between two inner end parts 320 which are adjacent to each other in a circumferential direction, to perform circumferential positioning on the bus bar retainer 60', and the size limit of the axial protruding part 640' can axially position the bus bar retainer 60'. In addition, the number of the axial protruding part 640' is one or more.

In at least one embodiment, as shown in FIG. 9, the main body part 610' may also be provided with a reduced diameter part 611', the outer circumferential surface of the reduced diameter part 611' is closer to the radial inner side of the outer circumferential surface of the other parts of the main body part 610', and the reduced diameter part 611' is overlapped with at least a part of the coil connecting part 510 in the radial direction. Therefore, similar to the function of the reduced diameter part 611, when a welding tool is used to weld the wire to the coil connecting part 510, the welding tool can be inserted into the space A. Moreover, the welding tool is separated from the bus bar retainer 60' by a certain distance, thereby inhibiting the heat generated by welding from melting, deforming or damaging the bus bar retainer.

In addition, as shown in FIG. 8, the outer circumferential surface of the insulating piece 30 may further be formed with an insulating rib 330 which extends in a circumferential direction, and the insulating rib 330 supports the first transition line part 442-1, the second transition line part 442-2 and the third transition line part 442-3 in an axial direction (as shown in FIG. 2). For example, an insulating rib 330 may be formed on the outer circumferential surface of the corresponding insulating piece 30 when the first transition line part 442-1, the second transition line part 442-2 and the third transition part 442-3 are overlapped in pairs, and an insulating rib 330 may further be formed on the outer circumferential surface of the insulating piece 30 in the circumferential range covered by the first transition line part 442-1, the second transition line part 442-2 and the third transition line part 442-3 axially corresponding to the coil connecting part 510.

In addition, as shown in two partial enlarged views in FIG. 1, a concave part 310b is formed on the outer end part 310 corresponding to the coil connecting part 510, the bottom surface of the concave part 310b is separated from the axial lowest side of the coil connecting part 510 by a certain distance, the thus formed space becomes a welding space, such that when the coil connecting part 510 and the transition line part 440 are welded, the welding jigs are easy to operate, and the concave part 310b can also be called as "a welding evading concave part".

According to the embodiment of the first aspect of the present application, when the first overlapping part of the first end part and the second overlapping part of the second end part are arranged to be at the same position in the circumferential direction, the first end part and the second end part can be connected with the coil connecting part of the bus bar through one assembly operation of the bus bar, thereby lowering complexity of the process, reducing man-hours, and reducing the production cost. Moreover, since the first end part and the second end part have an overlapped part in the axial or radial direction, the size of the stator is further reduced.

Embodiment of the Second Aspect

Figure 11:
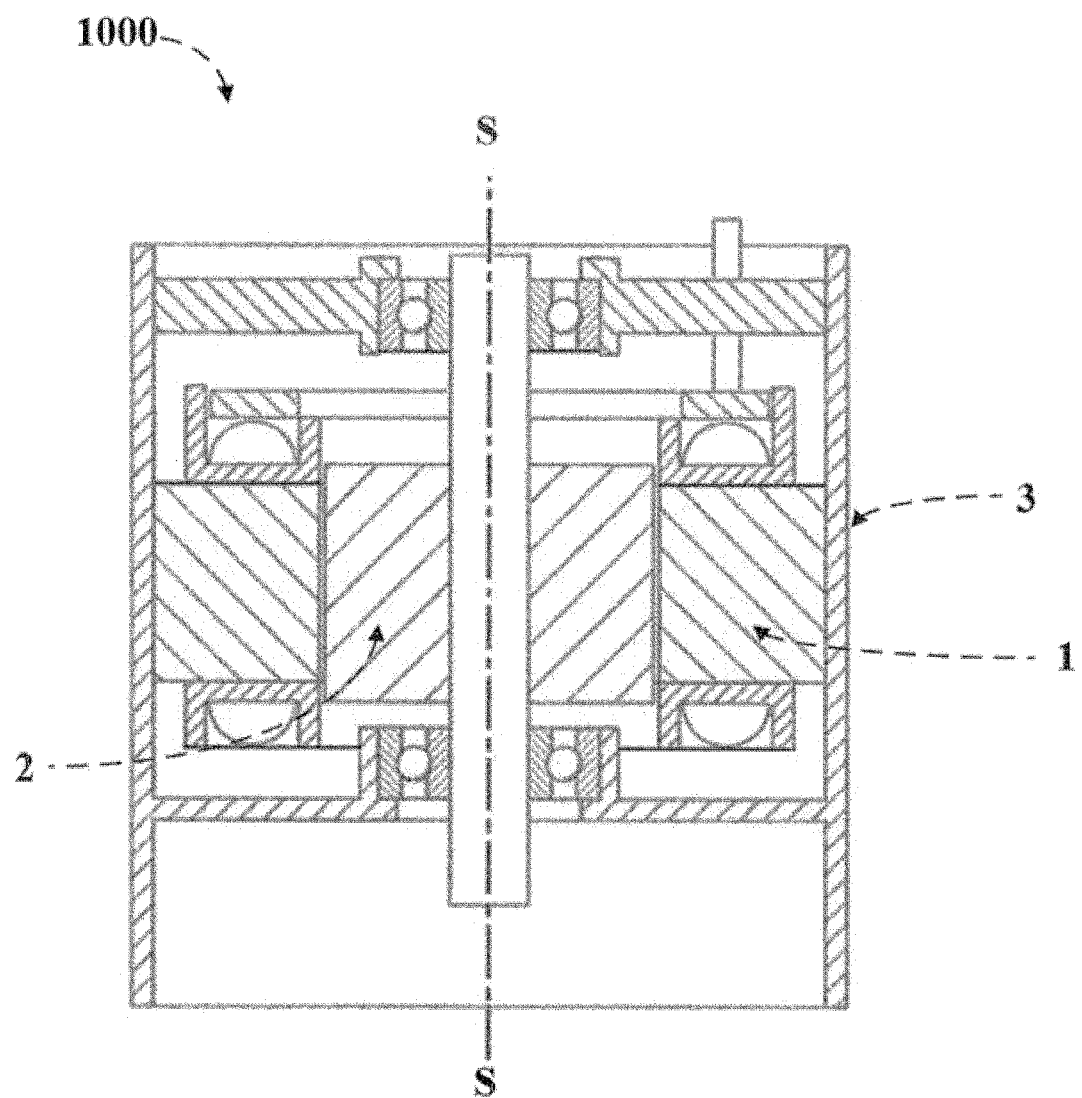
FIG. 11 is a schematic diagram of an axial section of a motor of an embodiment of the present application.

An embodiment of the second aspect of the present application provides a motor, and FIG. 11 is a schematic diagram of an axial section of the motor.

As shown in FIG. 11, the motor 1000 is provided with a stator 1 mentioned in the embodiment of the first aspect, a rotor 2 configured at the radial inner side of the stator 1, and a motor housing 3 accommodating the stator 1 and the rotor 2. Since in the embodiment of the first aspect, the structure of the stator 1 is described in detail, the content is incorporated herein, and description is omitted herein. In addition, for the structures of the rotor 2 and the motor housing 3, please refer to related technology, and description is also omitted herein. In addition, the motor 1000 may further include other parts, for specific details, please refer to related technology, and description is also omitted herein.

Figure 12:
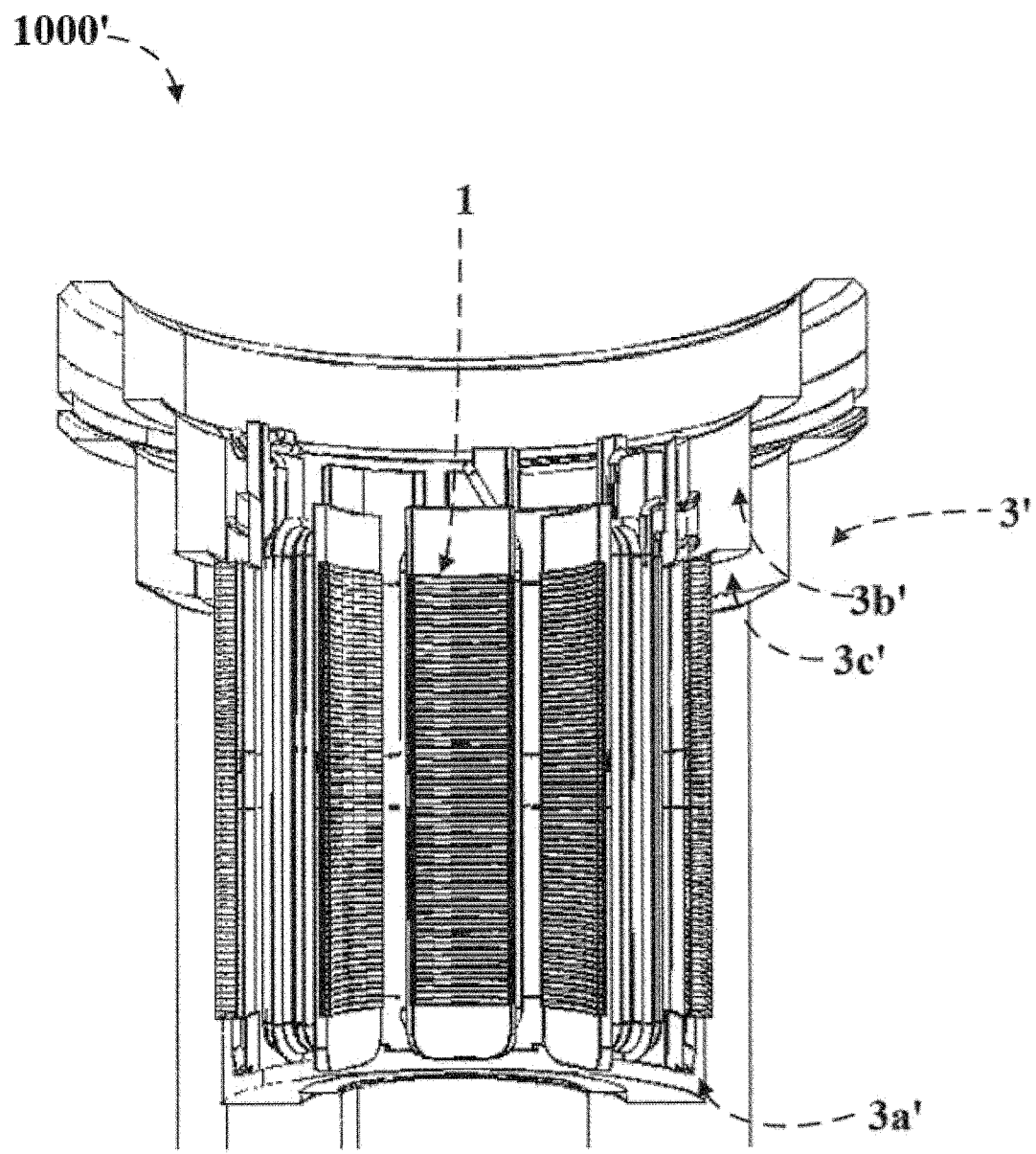
FIG. 12 is a schematic diagram of a part of an axial section of another embodiment of a motor in the present application.

FIG. 12 is part of the schematic diagram of an axial section of another embodiment of the motor.

In at least one embodiment, as shown in FIG. 12, the inner circumferential surface of the motor housing 3' may be provided with a first inner circumferential surface 3a', a second inner circumferential surface 3b' and a segment difference surface 3c'. The first inner circumferential surface 3a' is in contact with the outer circumferential surface of the stator 1 (not shown in the figure); the second inner circumferential surface 3b' is closer to the radial outer side than the first inner circumferential surface 3a'; the segment difference surface 3c' is connected with the first inner circumferential surface 3a' and the second inner circumferential surface 3b', and the segment difference surface 3c' may also be configured with a riveted part (not shown in the figure), and the stator 1 is fixed on the first inner circumferential surface 3a' through the riveted part. Therefore, the stator can be fixed to the housing through simple operations.

According to the embodiment of the second aspect of the present application, when the first overlapping part of the first end part and the second overlapping part of the second end part are arranged to be at the same position in the circumferential direction, the first end part and the second end part can be connected with the coil connecting part of the bus bar through one assembly operation of the bus bar, thereby lowering complexity of the process, reducing man-hours, and reducing the production cost, and further simplifying the assembly operation of the motor, and reducing the production cost of the motor. Since the first end part and the second end part have an overlapped part in the axial or radial direction, the size of the motor is further reduced.

The present application is described above in combination with specific embodiments, however, those skilled in the art should understand that, the description is merely exemplary, rather than a limitation to the protection scope of the present application. Various variations and modifications can be made to the present application according to the spirit and principle of the present application, and these variations and modifications shall also fall within the scope of the present application.

The invention claimed is:

1. A stator, comprising:
   an iron core back, configured to be a circular ring with a center axis which extends along an up and down direction as the center;
   multiple teeth, wherein the teeth protrude from the iron core back towards the radial inner side;
   an insulating part, wherein the insulating part covers at least axial end faces of the multiple teeth;
   coil groups, wherein the coil groups are respectively wound on the multiple teeth across the insulating part;
   multiple bus bars, wherein each of the multiple bus bars is provided with a coil connecting part and an external power supply connecting part, the coil connecting part is connected with the coil group, and the external power supply connecting part is connected with the external power supply; and
   a bus bar retainer, configured to support the multiple bus bars,
   the stator has the following characteristics:
   the coil group is provided with a first end part, a second part, multiple coils respectively wound on the multiple teeth, and a transition line part configured to connect the multiple coils,
   the first end part is provided with a first overlapping part having the same position as at least a part of the second end part in the circumferential direction,
   the second end part is provided with a second overlapping part having the same position as the first overlapping part in the circumferential direction, and
   the coil connecting part is connected with the first overlapping part and the second overlapping part.

2. The stator of claim 1, wherein the first overlapping part is overlapped with the second overlapping part in the axial direction.

3. The stator of claim 1, wherein the first overlapping part is overlapped with the second overlapping part in the radial direction.

4. The stator of claim 1, wherein the transition line part comprises:
- a transition line connecting part, wherein the transition line connecting part is arranged between two coils which are adjacent in the circumferential direction among the multiple coils, and is connected with the coil connecting part;
- a first transition line part, wherein the first transition line part is connected between multiple first phase of coils which are separately configured in the circumferential direction;
- a second transition line part, wherein the second transition line part is connected between multiple second phase of coils which are separately configured in the circumferential direction;
- a third transition line part, wherein the third transition line part is connected between multiple third phase of coils which are separately configured in the circumferential direction; and
- the first transition line part, the second transition line part and the third transition line part are configured towards the direction far away from the multiple teeth axially according to a winding sequence, and the coil connecting part is axially configured to be on a side far away from the multiple teeth relative to the first transition line part, the second transition line part and the third transition line part.

5. The stator of claim 4, wherein
the first overlapping part and the second overlapping part are arranged on the axial upper side of the transition line part.

6. The stator of claim 1, wherein
each of the multiple bus bars is further provided with an intermediate part, and the intermediate part is connected with the coil connecting part and the external power supply connecting part, and
the intermediate part is maintained on the bus bar retainer.

7. The stator of claim 6, wherein
the intermediate part is closer to the radial inner side than the coil connecting part.

8. The stator of claim 4, wherein
the insulating part is an insulating piece,
the insulating piece is provided with an outer end part and an inner end part,
the outer end part is arranged closer to the radial outer side than the multiple coils,
the inner end part is arranged closer to the radial inner side than the multiple coils,
the outer end part is provided with a first wall part and a second wall part,
the first wall part protrudes upwards from the upper surface of the outer end part on the circumferential side of the coil connecting part,
the second wall part protrudes upwards from the upper surface of the outer end part on another circumferential side of the coil connecting part,
the first wall part is at least partially overlapped in the radial direction with the tooth arranged on a circumferential side of the two teeth which are adjacent in the circumferential direction,
the second wall part is at least partially overlapped in the radial direction with the tooth arranged on another circumferential side of the two teeth,
the transition line connecting part extends from the second wall part towards the first wall part, and
the coil connecting part is arranged between the first wall part and the second wall part in a circumferential direction.

9. The stator of claim 1, wherein
the insulating part is an insulating piece,
the insulating piece is provided with an outer end part and an inner end part,
the outer end part is closer to the radial outer side than the multiple coils,
the inner end part is closer to the radial inner side than the multiple coils,
the outer end part is provided with a third wall part and a fourth wall part,
the third wall part protrudes upwards from the upper surface of the outer end part on the circumferential side of the coil connecting part,
the fourth wall part protrudes upwards from the upper surface of the outer end part on another circumferential side of the coil connecting part,
the third wall part is at least partially overlapped in the radial direction with the tooth arranged on a circumferential side of the two teeth which are adjacent in the circumferential direction,
the fourth wall part is at least partially overlapped in the radial direction with the tooth arranged on another circumferential side of the two teeth,
the third wall part is provided with a first gap part and a first pin part, the first gap part is concave from the upper surface of the third wall part towards the lower side and is cut-through in the radial direction, and the first pin part is arranged on a circumferential side of the first gap part,
the fourth wall part is provided with a second gap part and a second pin part, the second gap part is concave from the upper surface of the fourth wall part towards the lower side and is cut-through in the radial direction, and the second pin part is arranged on another circumferential side of the second gap part,
the first end part is wound on the second pin part, extends along a circumferential direction from the second gap part towards the first gap part, and is accommodated in the first gap part, and
the second end part is accommodated in the second gap part, extends along a circumferential direction from the second gap part towards the first gap part, and is wound on the first pin part.

10. The stator of claim 8, wherein
at least a part of the upper surface of the inner end part is in contact with the lower surface of the bus bar retainer,
the outer end part is provided with a notch part, and the notch part is concave downwards from the upper surface of the external end part, and is cut-through in the radial direction,
the bus bar retainer is provided with a main body part and a radial protruding part which protrudes from the main body part towards the radial outer side, and
the radial protruding part is embedded into the notch part.

11. The stator of claim 10, wherein
the main body part is provided with a reduced diameter part, and the outer circumferential surface of the reduced diameter part is closer to the radial inner side than the outer circumferential surface of other parts of the main body part, and
the reduced diameter part is overlapped with at least a part of the coil connecting part in the radial direction.

12. The stator of claim 8, wherein
at least a part of the upper surface of the inner end part is in contact with the lower surface of the bus bar retainer,
the bus bar retainer is provided with a main body part and an axial protruding part which protrudes from the main body part towards the axial lower side, and
the axial protruding part is embedded between two inner end parts which are adjacent in a circumferential direction.

13. The stator of claim 12, wherein
the main body part is provided with a reduced diameter part, and the outer circumferential surface of the reduced diameter part is closer to the radial inner side than the outer circumferential surface of other parts of the main body part, and
the reduced diameter part is overlapped with at least a part of the coil connecting part in the radial direction.

14. A motor, comprising:
the stator of claim 1;
a rotor configured at a radial inner side of the stator; and
a motor housing for accommodating the stator and the rotor.

15. The motor of claim 14, wherein
the inner circumferential surface of the motor housing is provided with:
a first inner circumferential surface, wherein the first inner circumferential surface is in contact with the outer circumferential surface of the stator;
a second inner circumferential surface, wherein the second inner circumferential surface is closer to the radial outer side than the first inner circumferential surface; and
a segment difference surface, wherein the segment difference surface is connected with the first inner circumferential surface and the second inner circumferential surface, and
the segment difference surface is configured with a riveted part, and the stator is fixed on the first inner circumferential surface through the riveted part.

* * * * *